US005916354A

United States Patent [19]

Dragt

[11] Patent Number: 5,916,354

[45] Date of Patent: Jun. 29, 1999

[54] VEGETABLE TOPPING, TAILING AND CUTTING MACHINE

[75] Inventor: Steven Richard Dragt, Bakersfield, Calif.

[73] Assignee: Wm. Bolthouse Farms, Inc., Bakersfield, Calif.

[21] Appl. No.: 09/021,193

[22] Filed: Feb. 10, 1998

[51] Int. Cl.$^{6}$ .......... A23N 15/00

[52] U.S. Cl. .......... 99/536; 99/546; 99/636; 99/642; 99/643

[58] Field of Search .......... 99/516, 517, 534, 99/536, 546, 635–643; 198/836.2, 396, 397; 209/570, 674; 426/481, 482, 518; 83/19, 22, 53, 39, 402, 409, 404.1, 446, 449, 932

[56] References Cited

U.S. PATENT DOCUMENTS

| | | | |
|---|---|---|---|
| 1,098,398 | 6/1914 | Phinney | 99/636 |
| 1,777,384 | 10/1930 | Smith | 99/636 X |
| 2,192,838 | 3/1940 | McGraw | 99/636 X |
| 3,670,792 | 6/1972 | Claussen | 99/643 |
| 3,738,258 | 6/1973 | Goodale | 99/643 |
| 3,800,693 | 4/1974 | Lent | 99/643 |
| 3,838,766 | 10/1974 | Wagers, Jr. et al. | 198/397 |
| 3,845,705 | 11/1974 | Chapman | 99/643 |
| 4,031,821 | 6/1977 | Loose et al. | 99/643 |
| 4,147,099 | 4/1979 | Persson | 99/636 |
| 4,327,616 | 5/1982 | Klukis | 83/409 |
| 4,367,675 | 1/1983 | Boots | 99/643 |
| 4,751,094 | 6/1988 | Orr et al. | 99/516 X |
| 4,785,729 | 11/1988 | Latreyte | 99/536 |
| 4,816,277 | 3/1989 | Frankstein et al. | 426/482 |
| 4,831,925 | 5/1989 | Zanetti | 99/643 |
| 5,134,928 | 8/1992 | Shiota | 99/574 X |
| 5,307,940 | 5/1994 | Kanegae | 209/517 |
| 5,320,033 | 6/1994 | Chapman et al. | 99/643 |
| 5,623,868 | 4/1997 | McKenna | 99/636 |

*Primary Examiner*—Timothy F. Simone
*Attorney, Agent, or Firm*—Flehr Hohbach Test Albritton & Herbert LLP

[57] ABSTRACT

A continuous flighted conveyor belt (18) is fed product (12) from a transverse direction. As the belt moves the product forward, offset water jets (56) cause some of the items not seated in a flight (20) to be rotated and captured in the flights. Further movement brings the product (12) to a zone where water jets (72) force all items to one side against a registration plate (76). Excess product and items not captured are forced off the surface of the belt by water jets (62) and are carried away to be fed again. A cutting blade (84) is set an appropriate distance from the registration plate (76) to trim product captured and registered. The products are then forced across the width of the belt by repositioning water jets 102 and stop against a second registration plate (104). A belt (82) covering the top of the belt flights (22) prevents items from escaping through the top of the conveyor. Products registered are trimmed on their other end and are optionally cut into segments of regular length by a gang cutter (44) set an appropriate distance from the registration plate.

12 Claims, 10 Drawing Sheets

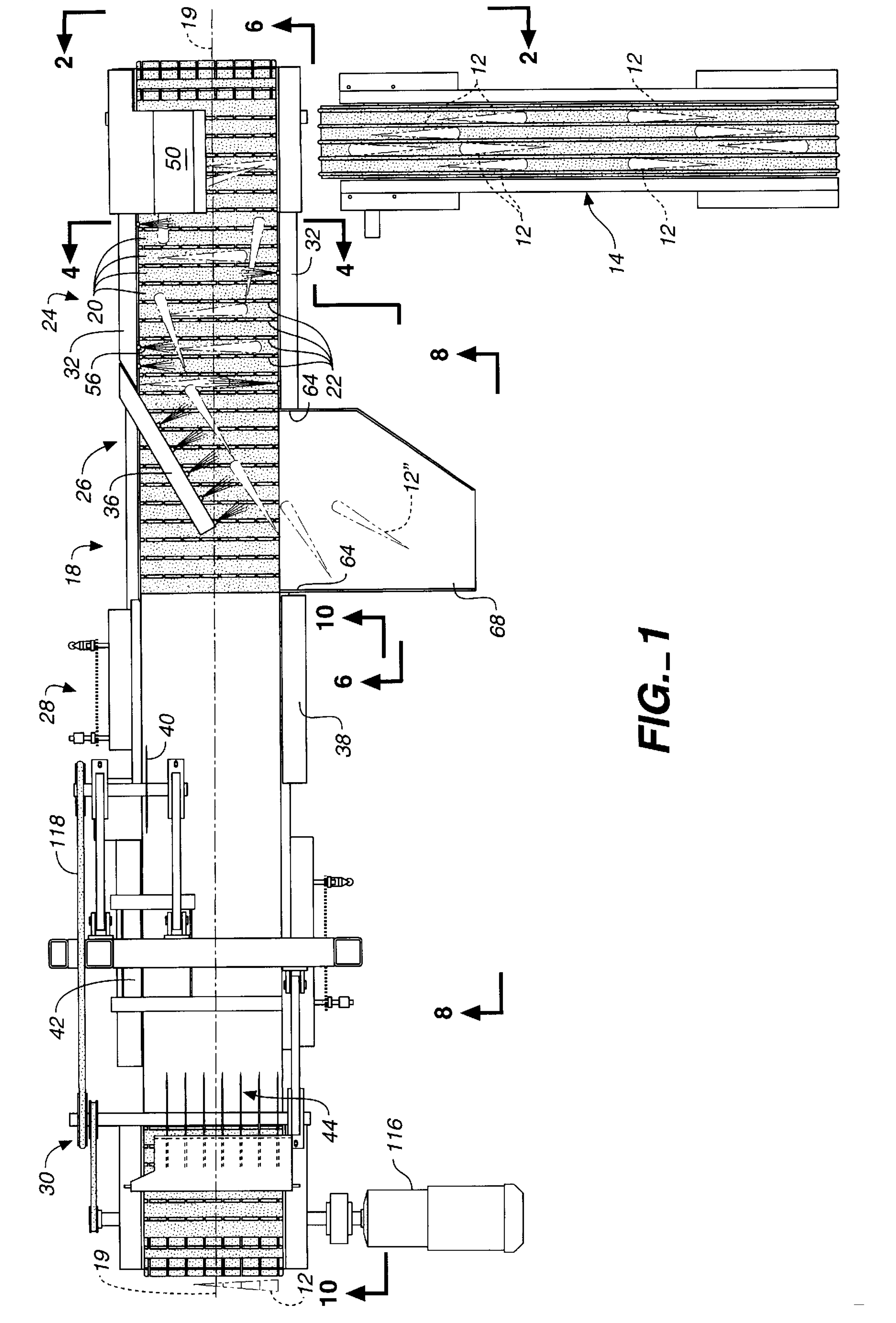
FIG._1

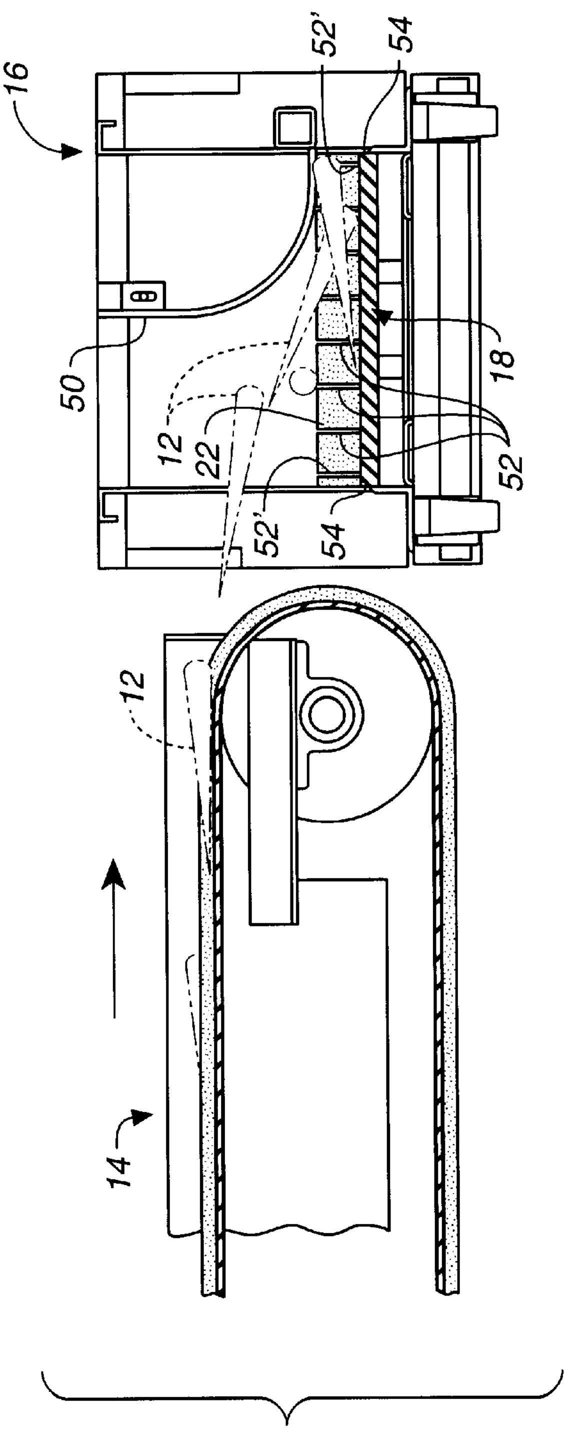
FIG._2
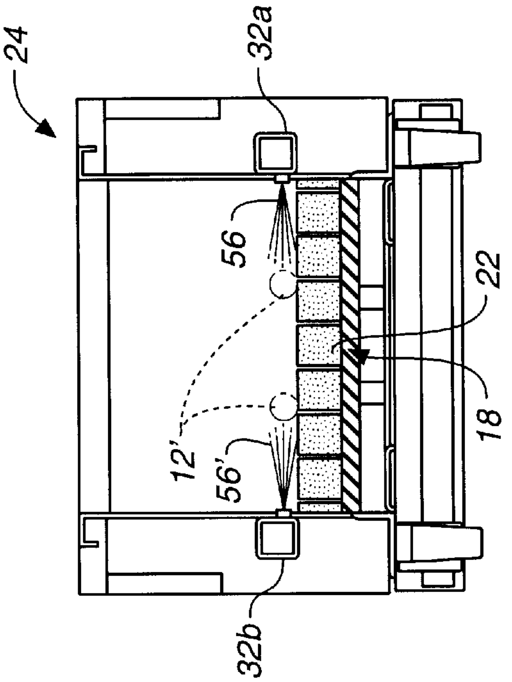
FIG._4

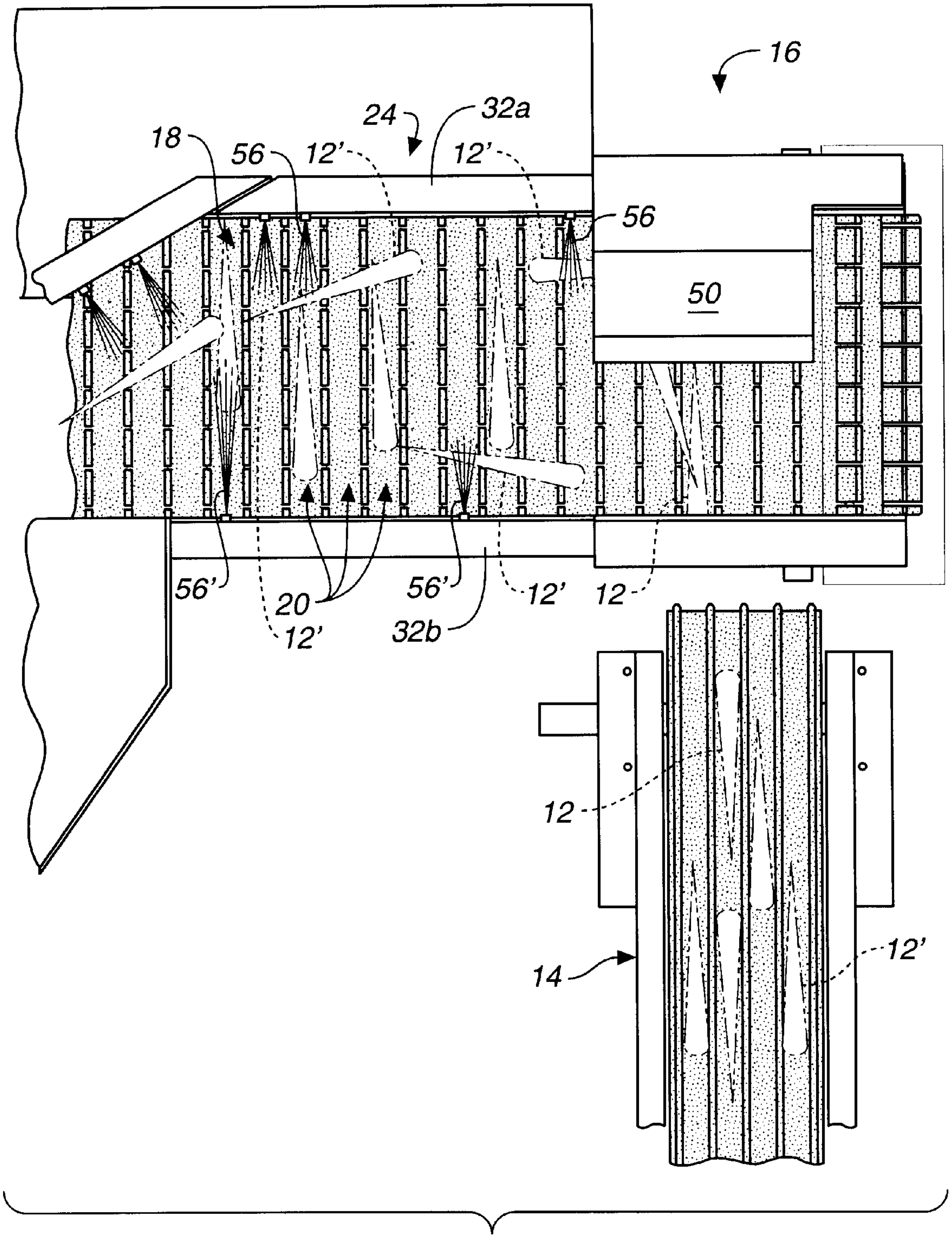
FIG._3

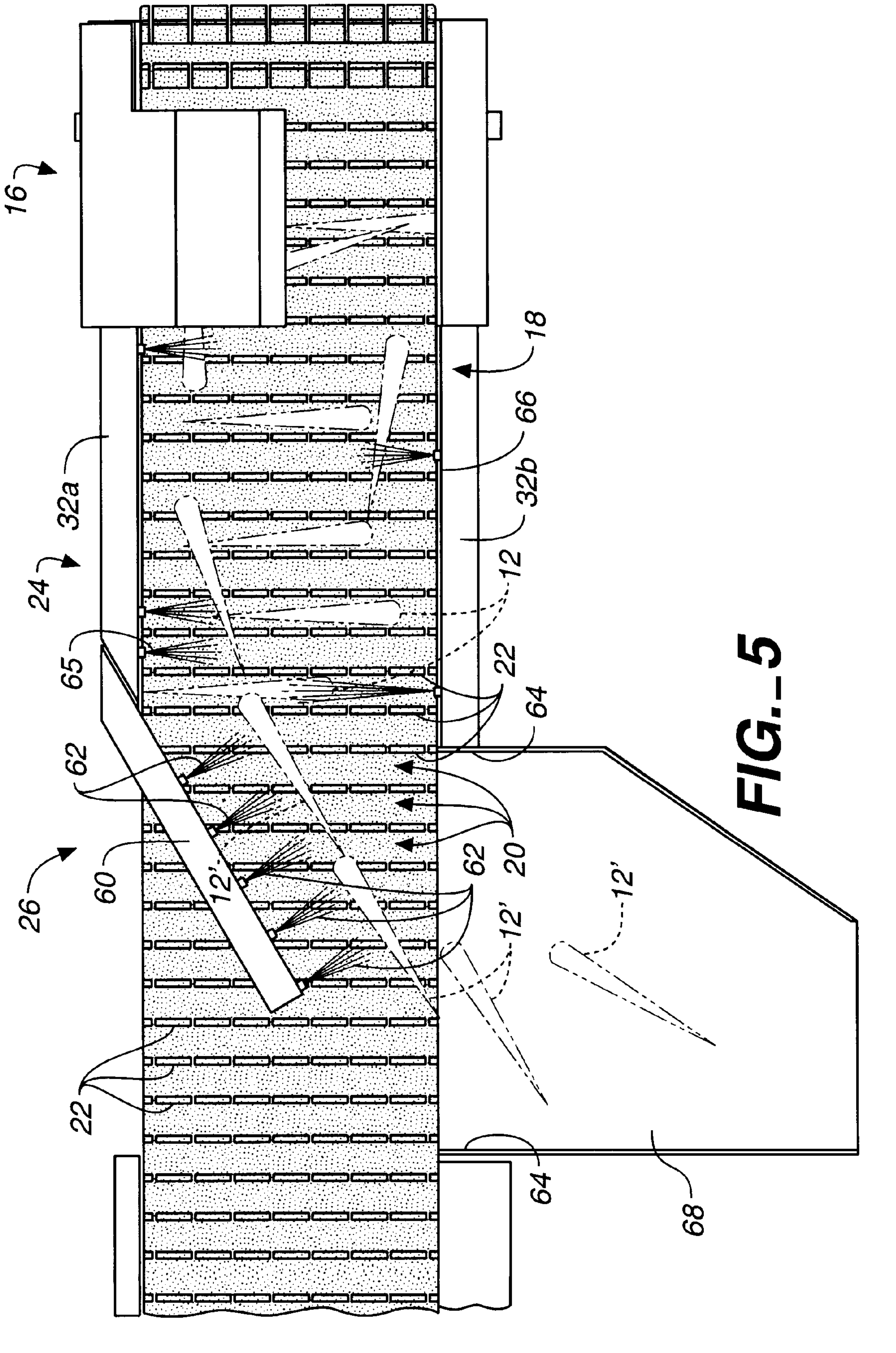
FIG._5

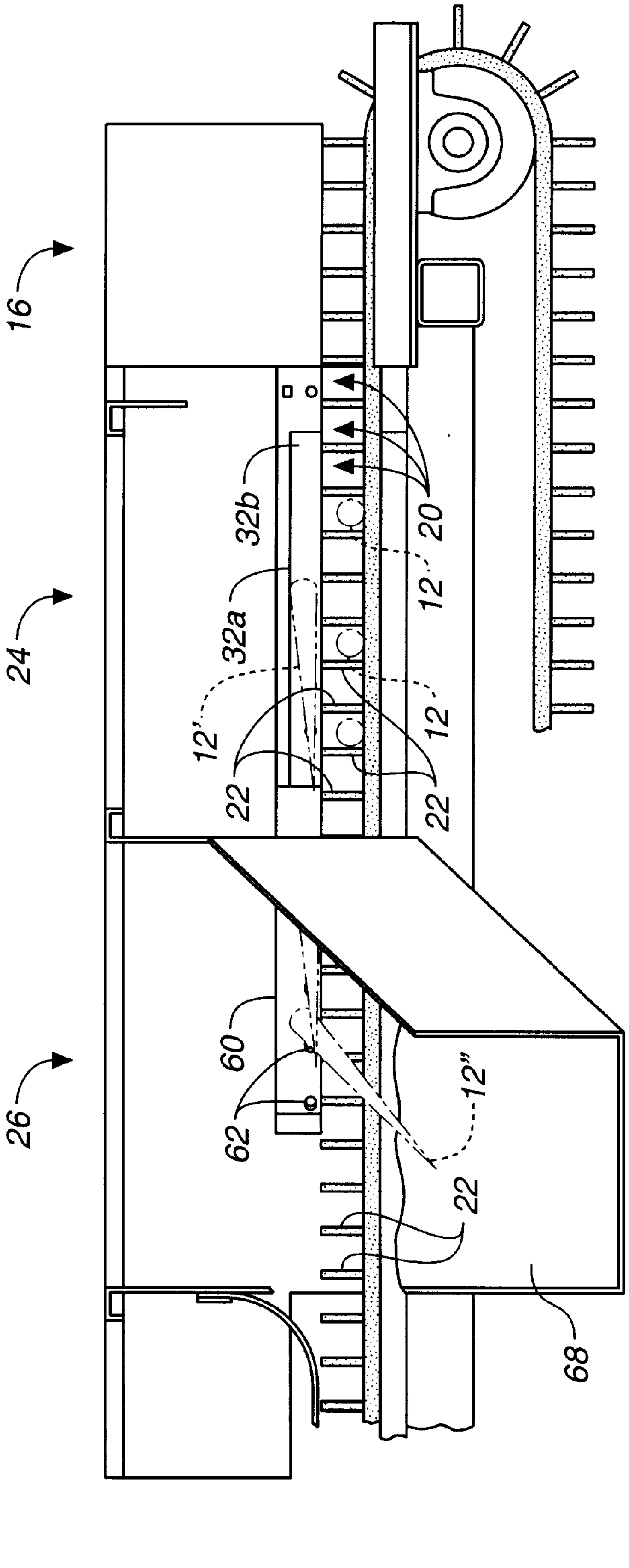
FIG._6

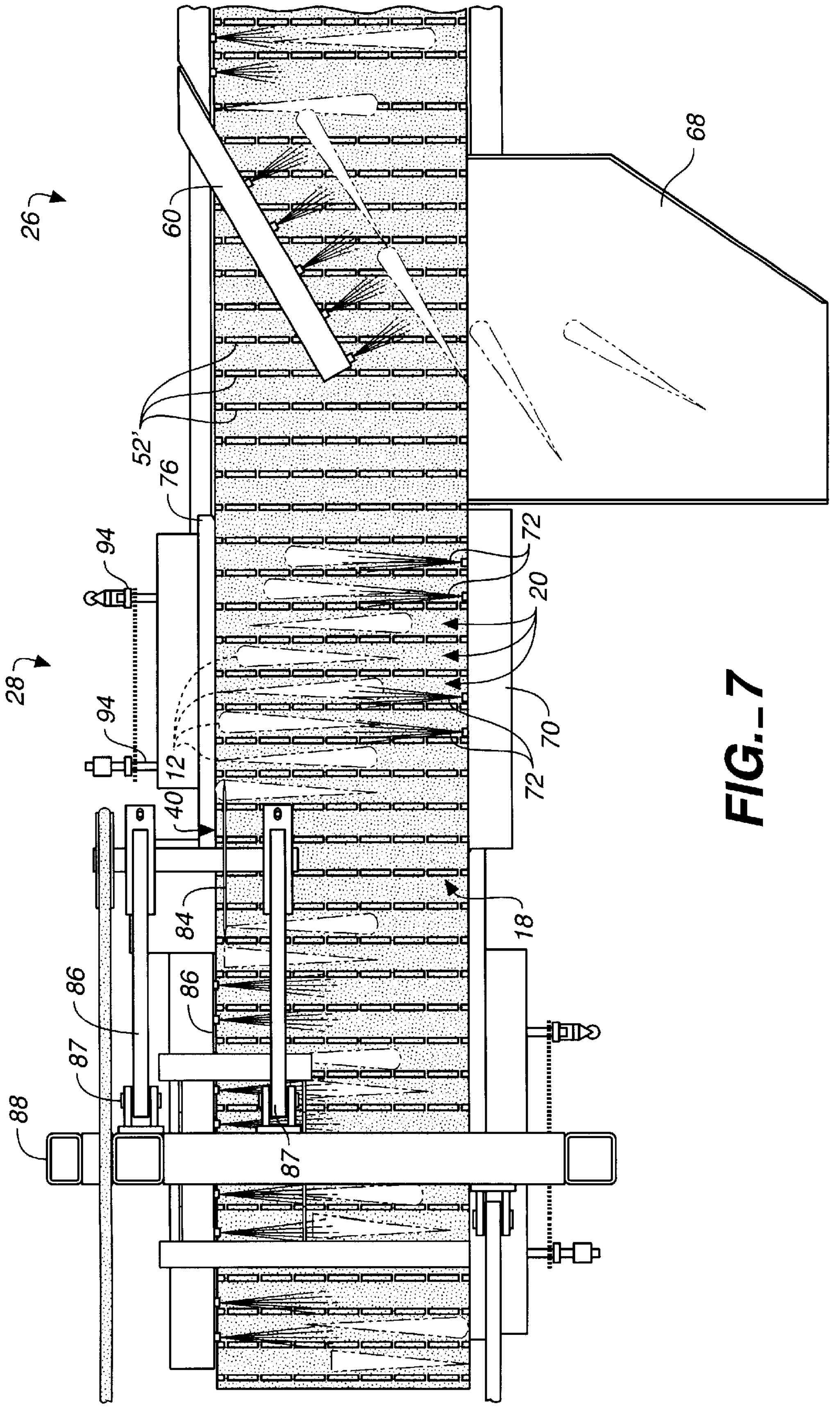
FIG._7

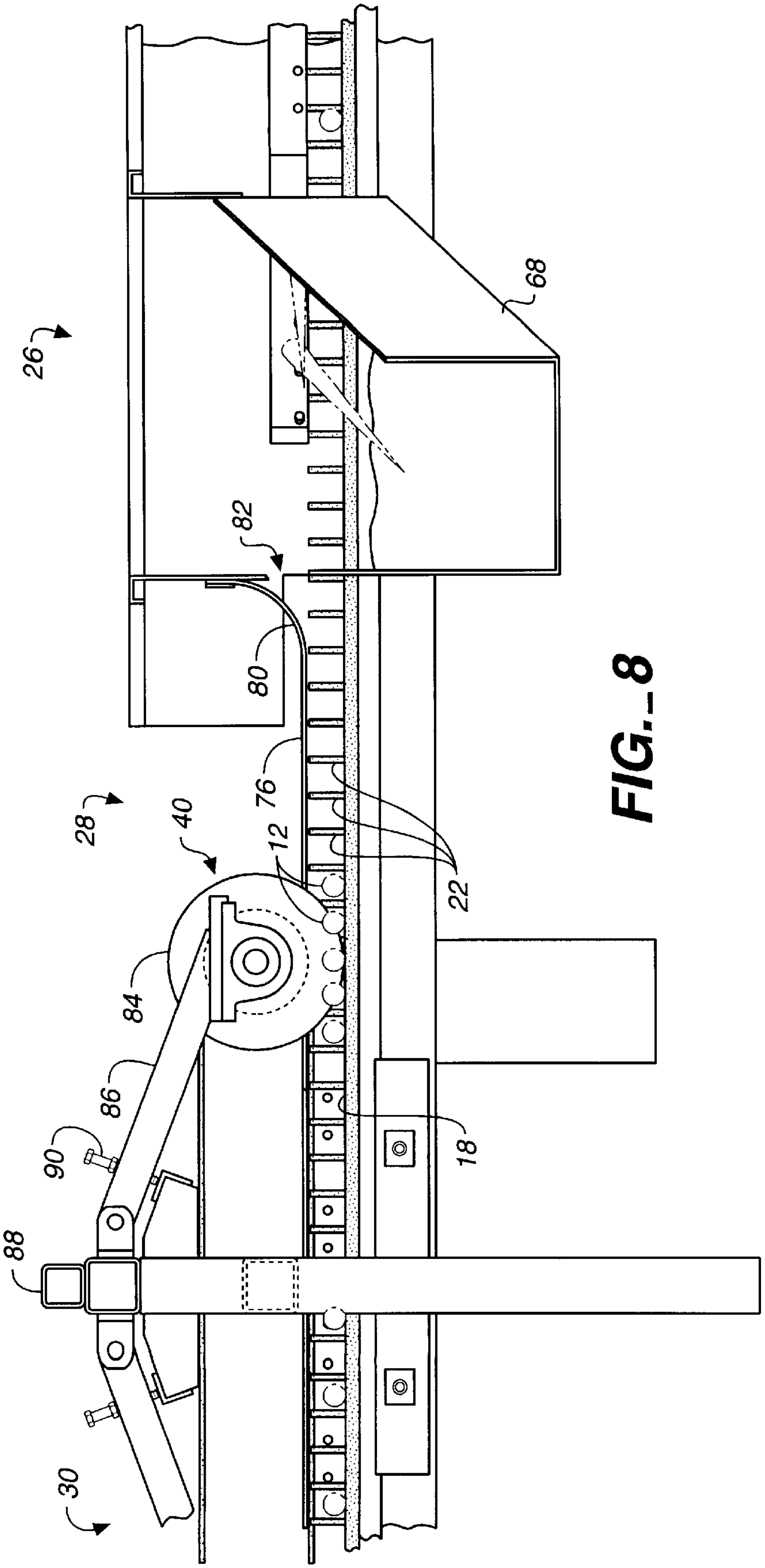
FIG._8

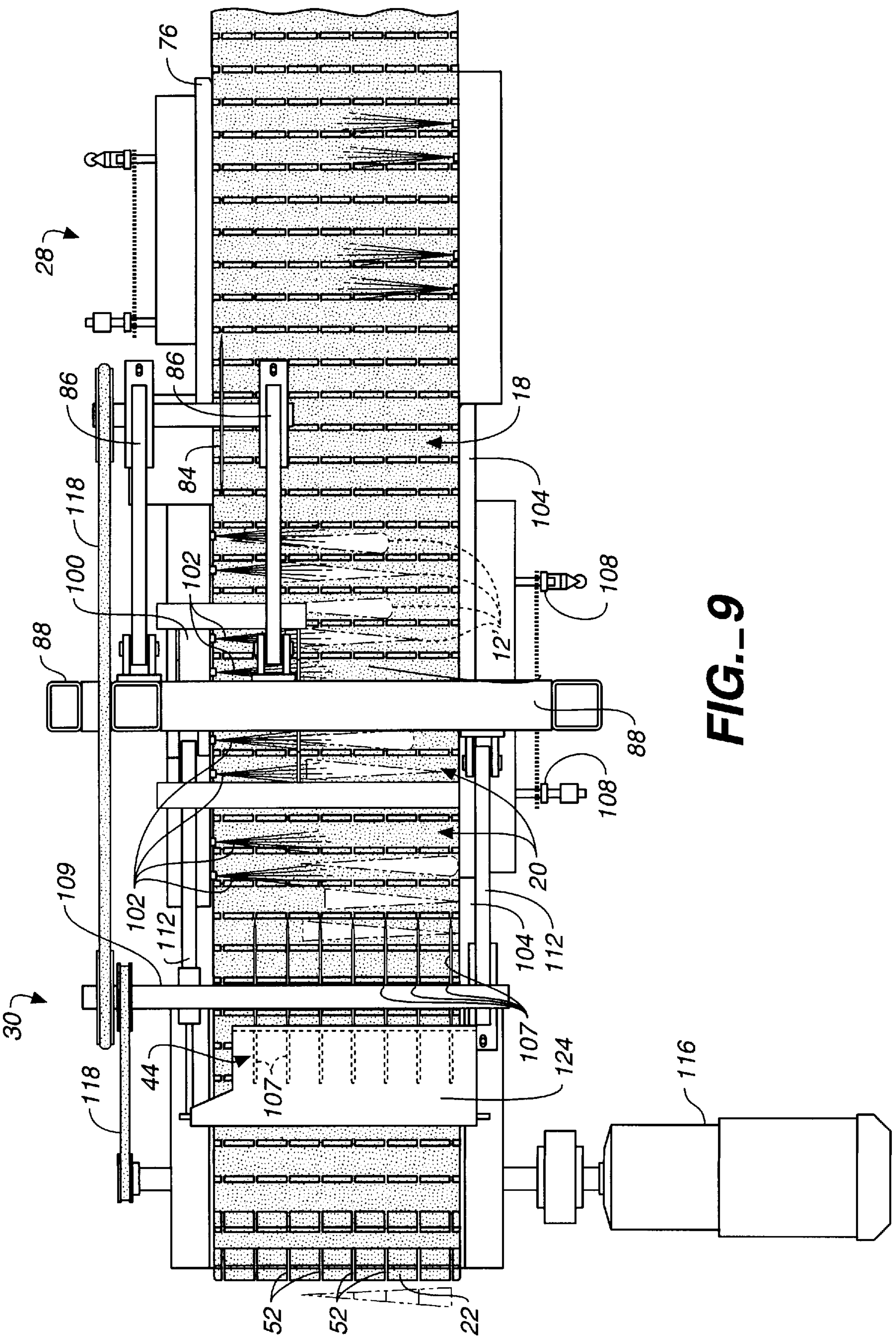
FIG._9

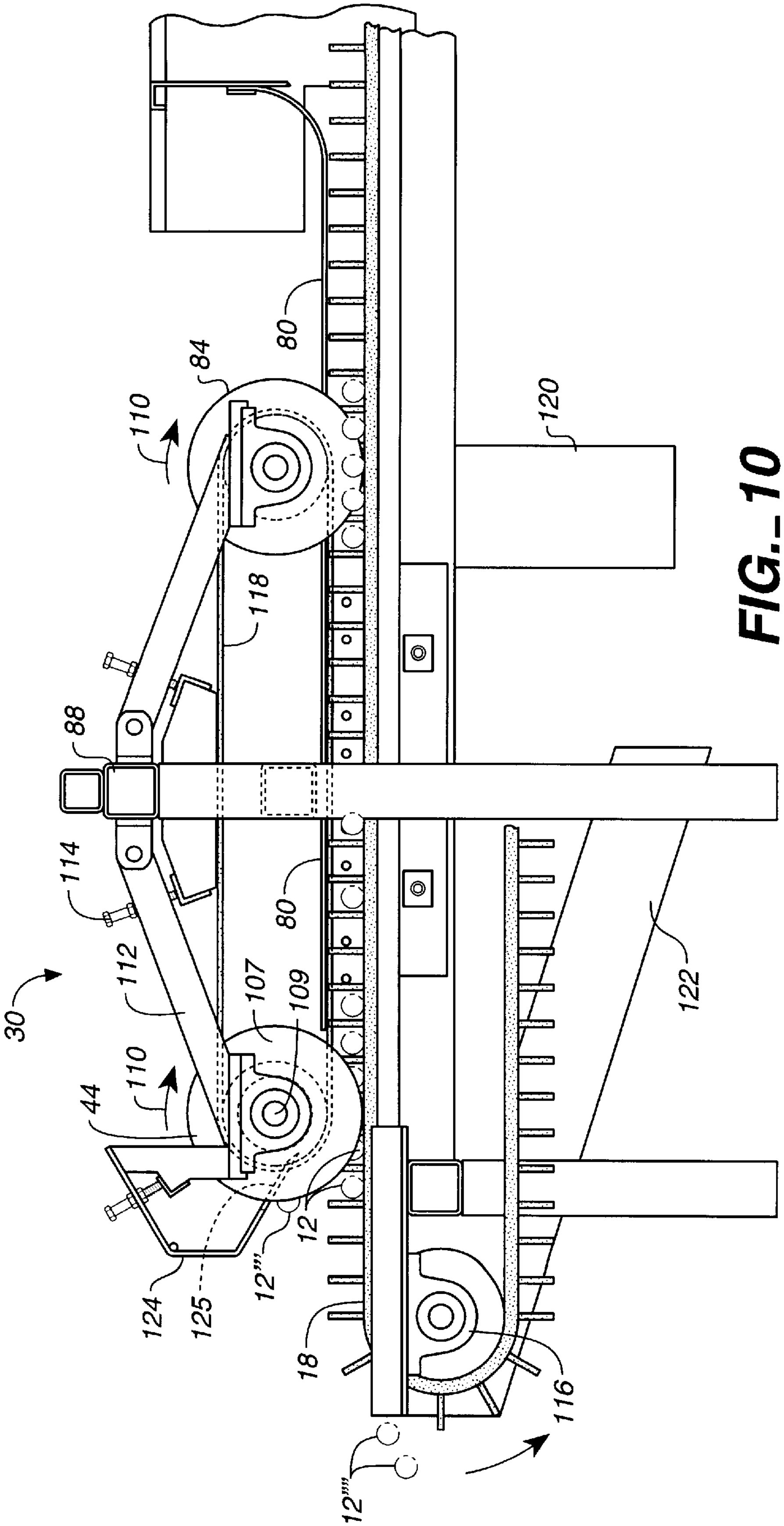
FIG._10

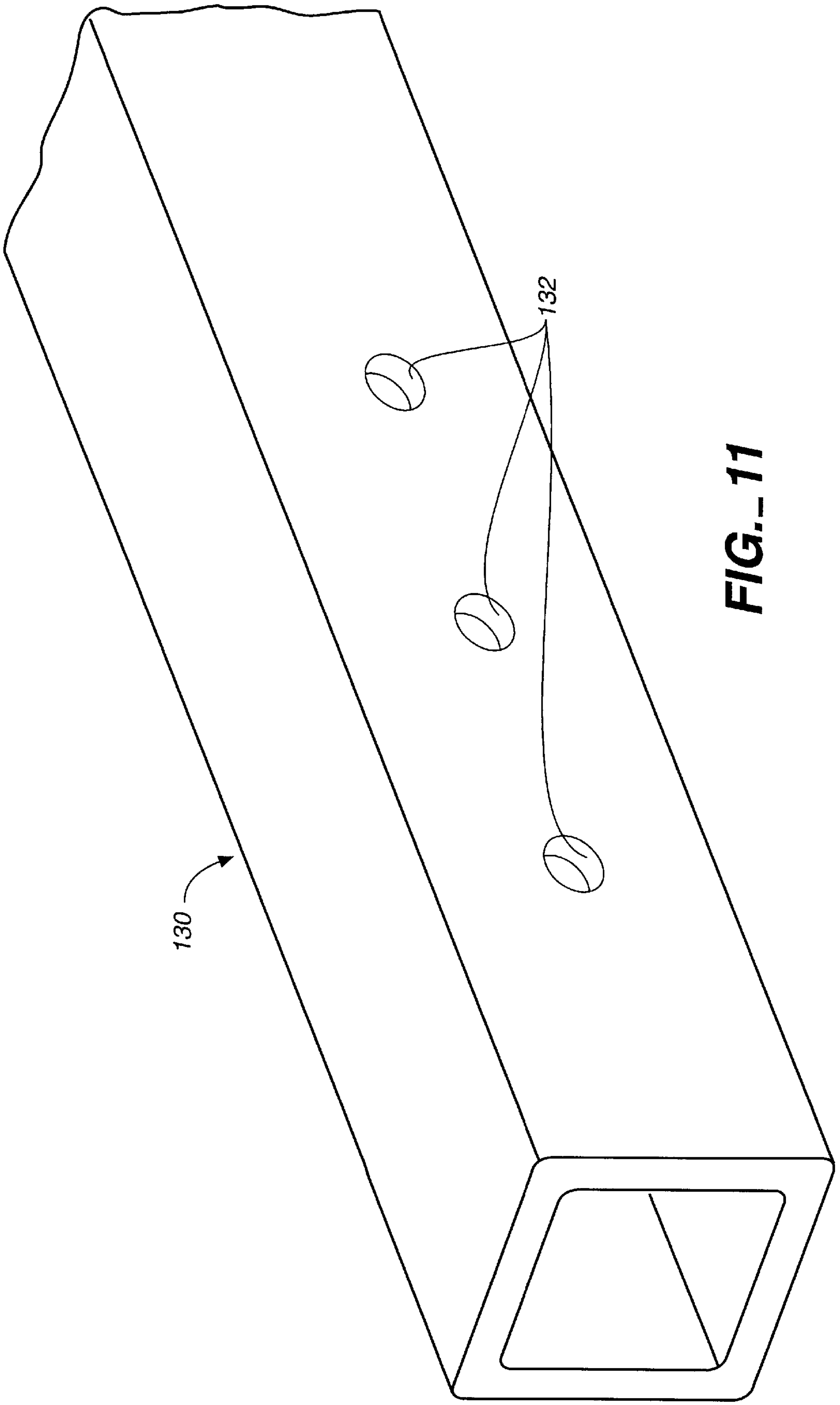
FIG._11

VEGETABLE TOPPING, TAILING AND CUTTING MACHINE

TECHNICAL FIELD

This invention relates to a method and apparatus for trimming the ends of vegetables, such as carrots, parsnips, cucumbers, celery, zucchini and the like, and optionally cutting these items to prescribed length segments.

BACKGROUND OF THE INVENTION

Many elongated vegetable commodities such as carrots, parsnips and cucumbers require end trimming and segment cutting to prepare them for processing and subsequent packaging. Since the length of each type of vegetable varies considerably, it is important to remove a measured amount from each end before cutting segments from the remaining product. This is normally accomplished by trimming one end and then sliding the product by some means to an opposite end where the other end is trimmed as well.

As early as 1914, Phinney describes in U.S. Pat. No. 1,098,398 a device where a continuous belt of pockets tips one way and then the other to trim both ends of string beans. In U.S. Pat. No. 3,738,258 Goodale discloses a similar concept whereby a chain of trays tips one way and then the other to trim carrots, parsnips and the like. Zanetti pursues a similar path as shown in U.S. Pat. No. 4,831,925 where he twists a continuous flighted belt from one side to the other as does Chapman in U.S. Pat. No. 5,320,033. Several attempts have been made to tip the conveyor to one side causing the product to slide to a registration stop as in U.S. Pat. No. 3,800,258 of Lent and U.S. Pat. No. 4,367,675 of Boots, but these only trim one end. McKenna discloses in U.S. Pat. No. 5,623,868 a method of capturing product between the flights of an inverted belt and sliding them from one side to the other using transversely running friction belts.

These machines all utilize mechanical means to orient and move their product, which involves a great number of mechanical parts and drives, such as drive shaft, belts, and timing devices. The complexity of these machines typically leads to maintenance problems and subsequent down time. In addition, these types of machines can be difficult to feed at a high rate, due to inertia of parts and handling limitations inherent in mechanical componentry, and do not accommodate feed problems well. The present invention addresses the shortcomings of previous machines in a novel way that allows for high production with low maintenance.

DISCLOSURE OF THE INVENTION

Briefly described, the vegetable trimmer of the present invention comprises a vegetable processing apparatus that includes a conveyor with individual, wide pockets for carrying vegetables in a manner that allows the vegetables to slide laterally within the pockets of the conveyor. The vegetable trimmer also includes a lateral abutment at one side of the conveyor and a water jet for laterally repositioning the vegetables in the pockets so that their ends abut the lateral abutment and the vegetables are positioned to have an end trimmed. Finally, the vegetable trimmer includes cutting means at one side of the conveyor for trimming the ends of the vegetables abutting the lateral abutment. Utilizing a water jet, or other fluid, as a source for laterally positioning the vegetables has the advantage of minimizing the number of mechanical parts needed to accomplish the same thing. As a result, machinery cost and maintenance are reduced, and improved control over the vegetables is achieved.

According to an aspect of the invention, an additional water jet is provided for ejecting from the conveyor vegetables not aligned within the pockets of the conveyor. These ejected vegetables can then be returned to the conveyor for proper alignment within the pockets. Preferably, the additional water jet is positioned to direct water above the pockets to hit vegetables resting on top of flights defining the pockets.

According to another aspect of the invention, a set of alignment water jets are provided upstream of the water jet for rotatably re-positioning the vegetables. The alignment set of water jets are positioned to direct jets of water above the pockets in a manner that causes vegetables resting on top of the pockets to rotate and fall into the pockets.

According to another aspect of the invention, both ends of the vegetables are trimmed by means of a second water jet, a second lateral abutment, and a second cutting means. The second lateral abutment is positioned at the side of the conveyor opposite the first lateral abutment, and the second water jet being positioned to direct a jet of water for laterally re-positioning the vegetables against the second lateral abutment.

According to another aspect of the present invention, the pockets of the conveyor are formed by upright, laterally extending dividers that have sufficient height to capture the vegetables and the cutting means includes a blade positioned above the conveyor. The dividers each include a slot extending down to the surface of the conveyor for receiving the blade as the dividers move past the cutting means. Preferably, the dividers each include multiple slots and the second cutting means comprises a gang cutter for cutting the vegetables into multiple pieces.

According to another aspect of the present invention, the vegetable processing apparatus includes a hold down means for keeping the vegetables within their respective pockets while being repositioned by the water jet. In a preferred embodiment, the hold down means is provided by a flexible material that is draped over the flights.

The present invention also includes a method of processing vegetables comprising the steps of conveying the vegetables along a processing path, directing a jet of water against the vegetables to laterally shift the vegetables against a lateral abutment positioned along one side of the processing path, and trimming the ends of the vegetables that are proximate the lateral abutment.

According to an aspect of the method, the vegetables are conveyed on an endless conveyor with individual pockets for carrying vegetables. The pockets are longer than the length of the vegetables, so that the vegetables can slide laterally of the conveyor within the pockets and against the lateral abutment.

According to another aspect of the method, an additional step is provided of directing additional jets of water against vegetables to reorient the vegetables so that they are properly aligned on the conveyer. Preferably, this step is performed by a set of off-set orienting jets that cause the vegetables to rotate into alignment with the conveyor pockets.

According to another aspect additional jets of water are directed against vegetables not properly aligned on the conveyor in order to eject the improperly aligned vegetable from the conveyor.

The method also includes a process for trimming both ends of the vegetables. After one of the ends of the vegetables are trimmed, a second water jet is directed against the vegetables to reposition the vegetables laterally against a second lateral abutment, and a cutting device trims the opposite ends of the vegetables.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 1 is a general top view of the cutting machine showing the feed end, orienting zone, return zone, trim zone and gang cut area;

FIG. 2 shows an end view of the entry zone where items are captured by a flighted belt;

FIG. 3 shows a top view of the orienting zone where items not seated in a flight are rotated by water jets several times in an attempt to find a flight with enough room for that item to fit;

FIG. 4 shows an end view of the orienting zone shown in FIG. 3;

FIG. 5 shows a top view of the return zone where items not seated in a flight are pushed out of the machine by water jets to be fed again;

FIG. 6 shows a side view of the return zone of FIG. 5;

FIG. 7 shows a top view of the trim zone where the product is pushed by water jets against a registration bar so the first cut can be made;

FIG. 8 shows a side view of the trim zone of FIG. 7;

FIG. 9 shows a top view of the repositioning and gang cut zone where the product is pushed back across the belt by water jets to a second registration bar so the second trim cut and subsequent gang cuts can be made;

FIG. 10 shows a side view of the cross feed and gang cut zone of FIG. 9;

FIG. 11 shows the design of a water jet manifold.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

FIG. 1 shows the general layout and operation of the vegetable trimmer and cutter 10 of the present invention. Vegetables, illustrated as carrots 12, are fed down an auxiliary feed conveyor 14 and onto a feed end 16 of an upper run of a main conveyor 18, which moves carrots 12 along a processing path 19. Conveyor 18 is a flighted conveyor in that it has elongated transverse pockets 20 defined by dividers or flights 22. The shape and length of pockets 20 are dependant on the type of vegetable being trimmed. For carrots, it is desirable to have long, narrow pockets. Cucumbers and parsnips, for example, may require shorter and wider pockets.

As carrots 12 move along conveyor 18, they sequentially move from feed end 16 into an orientation zone 24, then into a return zone 26, then into a trim zone 28, and then into a gang cut and trim zone 30. After gang cut and trim zone 30, carrots 12 fall from conveyor 18 into a suitable receptacle (not shown).

Briefly, in orientation zone 24, carrots 12 are transversely aligned into pockets 20 by means of water jets 32. Any carrots not properly aligned within a pocket are ejected from conveyor 18 in return zone 26 by means of an angled set of water jets 36. Rejected carrots are returned to feed conveyor 14, either manually or preferably by additional conveyors (not shown). In trim zone 28, carrots 12 are laterally slid to one side of conveyor 18, again by a set of water jets 38, and have one of their ends trimmed by a cutting device 40. In gang cut and trim zone 30, carrots are repositioned to an opposite side of conveyor 18 by means of a set of water jets 42, and then are gang cut by a gang cutter 44, which cuts the carrots into preselected lengths at the same time as trimming the opposite ends of the carrots.

Referring to FIG. 2, carrots 12 are oriented in their direction of travel on auxiliary feed conveyor 14, which accelerates the carrots onto feed end 16 of conveyor 18. Conveyor 14 uses longitudinal ribs (not shown) rising from the surface of its conveyor belt to maintain the orientation of the carrots. The orientation of carrots 12 on conveyor belt 14 can be expected to be equally divided between top first and tail first carrots. Regardless, the carrots are accelerated to the velocity of conveyor belt 14 and then released to fall through a natural trajectory onto conveyor belt 18, which moves perpendicular to conveyor belt 14.

Feed end 16 of conveyor 18 includes a curved capture deflector 50, which extends from the far side of conveyor 18, just above dividers or flights 22, to a point above the middle of conveyor 18 and above auxiliary conveyor 14. Carrots that happen to fall between the flights 22 of conveyor 18 have sufficient energy to slide to the far side of the belt and are prevented from bouncing out by capture deflector 50. Carrots that land on top of a flights 22 and carrots that are not properly oriented through their trajectory normally rotate 90 degrees so that their longitudinal axis follows the direction of travel of conveyor belt 18.

As can be seen in FIG. 2, dividers or flights 22 include a series of equally spaced slots 52. The outer most slots 52' are spaced a short distance from the sides 54 of conveyor 18, which distance corresponds to the desired trim of the tips and tails of the carrots. The height of flights 22 should be greater than the height of the carrots, so that the carrots sit down within the pockets defined by flights 22, for reasons discussed later.

Aside from the design of flights 22, conveyor 18 is a conventional conveyor, the design and operation of which may vary, but which will be well known to those skilled in conveyor designs.

FIGS. 3 and 4 show orientation zone 24, where offset water jets rotate misaligned carrots 12' that are not captured in a pocket 20. A first set of water jets **32*a* are positioned on one side of conveyor 18 and a second, offset set of water jets 32*b* are positioned on the opposite side of conveyor 18. As shown in FIG. 4, water jets 32*a* and 32*b* are located above flights 22, in position to direct jets of water 56, 56' against carrots 12' riding on top of flights 22. The first water jets 32*a* may include any number of water jets 56, as may second water jets 32*b*, but it is important that jets 32*a* and 32*b* be offset. In operation, misaligned carrots 12', which are aligned generally in the direction of travel of conveyor 18 and are riding on top of flights 22, move out of feed end 16 and out from under capture deflector 50. As carrots 12' enter orientation zone 24, water jets 56 strike adjacent carrots at their leading end first, which rotates the carrots until they are generally aligned with and fall into pockets 20. If water jets 56 are not successful in dropping the carrots into a pocket, second water jets 56'**, on the opposite side and offset from the first jets, strike the carrots with a jet of water, causing the carrots to rotate in an opposite direction and drop into a pocket.

In addition, many carrots 12' will be subject to the force of both the first jets 32*a* and the second jets 32*b*. When this happens, one jet forces the leading end of the carrots in one direction while the other jet forces the trailing end in an opposite direction. The opposed forces of the jets creates a considerable moment in the carrots, causing them to rotate and fall into the pockets. Four orientation jets are shown in FIG. 3 and they are set at non-uniform spacings. Since vegetables processed by the present invention come in a wide variety of lengths, each being ideally rotated by jets with different spacing, it is desirable to space the jets so as to provide variable spacings to cover a wide range of vegetable lengths.

It should be noted that carrots properly aligned within pockets 20 are not affected by water jets 32*a,* 32*b* because the jets are positioned above flights 22 and direct their jets generally horizontally over the pockets, as is shown in FIG. 4, and thus over the carrots within the pockets.

FIGS. 5 and 6 show return zone 26, which includes an angled water jet manifold 60 that includes a series of angled water jets 62. Like orienting jets 32*a,* 32*b,* angled jet manifold 60 is positioned above flights 22 and directs water jets 62 above pockets 20, rather than down into pockets 20. Jet manifold 60 is shown to include five water jets 62, but could include more or fewer jets, depending on the type of vegetables being processed.

While orienting jets 32*a,* 32*b* work well in reorienting carrots in the pockets, some carrots may escape the reorienting effect of the jets and remain improperly aligned on top of flights 22. For these carrots, identified as carrots 12", angled jets 62 push the carrots sideways across the top of flights 22 to an opening 64 in the sidewall 66 of conveyor 18, where a return chute 68 is secured just below the top of the flights. Preferably, a return conveyor (not shown) is set below return chute 68 for returning carrots 12" to the feed conveyor. Carrots 12 that are seated in a pocket are not affected by angled jets 62 since the jets are located above the top of the cutter belt flights.

An additional water jet 65 is provided to prevent carrots from getting stuck at the comer of manifold 60 and manifold 32*a*.

The water-based processing system utilized by the conveyor of the present invention allows for greater volume through-put than earlier mechanical designs that have difficulty handling excess feed. A main reason for this is the ability of the present machine to handle overfeeding, where a high percentage of each pocket is filled with multiple carrots and any excess carrots are handled by the angled jets 62, which eject the excess carrots into the return chute 68.

FIGS. 7 and 8 show first trim zone 28. Trim zone 28 includes a trim jet manifold 70, which creates a set of laterally directed water jets 72. Trim jet manifold 70 is positioned at the height of pockets 20 in order to direct water jets 72 through the pockets and against carrots 12 laterally contained therein. Trim zone 28 also includes a side registration bar 76, which is positioned at the side edge of conveyor 18 and extends along the entire length of trim zone 28. Registration bar 76 has a height sufficient to extend from the surface of conveyor 18 to a point above flights 22.

Trim zone further includes a roof panel 80 in the form of a belt laid over the flights of the conveyor, which is shown in FIG. 8 but is removed from FIG. 7 in order to show the position of carrots 12. Roof panel 80 spans the width of conveyor 18 and extends from the beginning of trim zone 28, which begins at point 82 just behind return chute 68, down into the gang cutter zone 30.

Cutting device 40 in the form of a rotary cutting blade 84 is positioned to one side of conveyor 18, spaced a short distance from registration bar 76. As best shown in FIG. 8, cutting blade 84 is adjustably mounted on an arm supports 86, which pivot at 87 and can be adjusted relative to a fixed frame structure 88 by means of a threaded bolt mechanism 90. Adjustment of bolt mechanism 90 changes the position of the lower edge of cutting blade 84 relative to the surface of conveyor 18. The gap between cutting blade 84 and registration bar 76 is equal to the distance between the outer most slot 52' in flights 22 and the side of the conveyor (see FIG. 2). As a result, cutting blade 84 extends down through the outer most slots and into the pockets.

In operation, carrots 12 are shifted laterally by water jets 72 against registration bar 76, which acts as a lateral abutment against which the carrots stop. Because roof panel 80 is positioned immediately over flights 22, carrots 12 remain captured within their pockets. Water jets 72 are sufficiently strong to ensure that all carrots within each pocket are shifted laterally. While no more that one carrot 12 is shown in a pocket, the pockets are large enough to handle two or more carrots and water jets 72 have sufficient strength to shift all the carrots in a pocket. The design of water jets 72 is discussed later.

As the carrots move past cutting blade 84, either their tops or tails are trimmed, depending on the orientation of the carrots. The extent the carrots are trimmed can be adjusted by laterally adjusting registration bar 76, which is supported on adjustable support arms 94.

If sufficient water flow is supplied, multiple carrots in each pocket can be correctly registered against registration bar 76 and trimmed by cutting blade 84. Roof panel 80 also ensures that the carrots remain in their respective pockets as they are trimmed. Trimmed pieces of carrot drop into a chip chute (not shown) to be disposed of.

FIGS. 9 and 10 show gang cutter zone 30. Gang cutter zone 30 includes a repositioning jet manifold 100, which creates a series of water jets 102, and a second registration bar 104, which is positioned along the opposite side of conveyor 18 from registration bar 76. Second registration bar 104 extends from cutting blade 84 down past gang cutter device 44, which includes a series of equally spaced cutting blades 107. The lateral positioning and spacing between cutting blades 107 corresponds to the spacing between the slots 52 of flights 22 so that blades 107 extend through slots 52 as flights 22 move past the blades.

Cutting blades 107 are mounted on a rotary shaft 109 that is supported on a pair of arm supports 112, which are, in turn, adjustably mounted to frame structure 88 by means of a threaded bolt adjuster 114.

Second registration bar 104 is supported on a pair of adjustable arms 108, which allow the lateral position of bar 104 to be adjusted relative to gang cutter 44 in order to adjust the extent of tail and tip trimming. Roof panel 80 extends down right up to the leading edges of the cutting blades of gang cutter 44 and thus covers carrots 12 during both cutting operations.

As shown in FIG. 10, cutting blades 107 and cutting blade 84 both rotate clockwise, as indicated by arrows 110. A conveyor motor 116 powers not only conveyor 18, but also gang cutter 44 and cutting blade 84, by means of a common belt and pulley mechanism 118. Cutting blade 84 and gang cutter blades 107 are rotated at a speed that results in the cutting edges of the blades moving at the same speed as conveyor 18. Since the cutting edges of the blades are in close proximity to the conveying belt of the conveyor, and may at times contact the belt, it is desirable that both the blades and the conveyor move at the same speed.

FIG. 10 also shows a first collection chute 120 for collecting trimmed carrot pieces from cutting blade 84 and a second collection chute 122 for collecting trimmed carrot pieces from gang cutter 44.

Trim zone 30 also includes a stripper plate 124 secured to arm support 112. Stripper plate 124 includes a set of fingers 125 that extend between cutting blades 107 of gang cutter 44 and function to strip wedged pieces of carrots 12''' from the blades 107 and back down onto conveyor 18.

Gang cutter 44 cuts carrots 12 into multiple segments at the same time as the untrimmed ends are cut by the outer most cutting blade 107', which is spaced a short distance from second registration bar 104.

In operation, water jets 102 push carrots 12 laterally across conveyor 18 and against second registration bar 104. As carrots 12 move underneath the cutting blades 107 of gang cutter 44, they are severed into equal length pieces and their tops or tails are trimmed by the outer most cutting blade. The trimmed pieces of carrots fall into collection chute 122. The equal length cut carrot segments 12'''' fall off the end of the conveyor and into a suitable receptacle or onto a downstream conveyor.

FIG. 11 shows a water jet manifold 130 that is exemplary of all of the water jet manifolds described herein. Manifold 130 is a square tubular pipe with a series of drilled holes 132 at prescribed locations. It has been found that for a water pressure of 50 psi, 1½ inch square tubing with ⅛ inch walls and 7/16 inch diameter holes produces a desirable water jet with sufficient force to reposition the carrots or other type of vegetable.

The vegetable trimmer of the present invention has been described as capable of trimming both ends of somewhat elongated vegetable products. However, the vegetable trimmer of the present invention can also be used solely to trim one end of product. In this embodiment, the products are aligned in the pockets, shifted against a first registration bar and then trimmed. No subsequent re-shifting and trimming of the opposite ends of the products is necessary.

In addition, while the present invention has been described herein as including one or more water jets, it should be understood that fluids other than water or that are partially or substantially made up of water may be used to practice the invention. Accordingly, in the claims that follow, use of the term water is meant to include any fluid capable of creating a fluid jet.

Furthermore, the term "vegetable" as used in the claims is also meant to include broadly any type of vegetable and fruit product.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

What is claimed is:

1. A vegetable processing apparatus, comprising a conveyor with individual pockets for carrying vegetables, the pockets being longer than the length of the vegetables, so that the vegetables can slide laterally of the conveyor within the pockets, a lateral abutment at one side of the conveyor, cutting means at said one side of the conveyor for trimming an end of the vegetables, a water jet for laterally re-positioning the vegetables in the pockets so that their ends abut the lateral abutment and the vegetables are positioned to have an end trimmed.

2. The vegetable processing apparatus of claim 1 wherein, at least two water jets are provided for laterally re-positioning the vegetables.

3. The vegetable processing apparatus of claim 1 wherein, an additional water jet is provided for ejecting from the conveyor vegetables not aligned within the pockets of the conveyor.

4. The vegetable processing apparatus of claim 3 wherein, the additional water jet is positioned to direct water above the pockets to hit vegetable resting on top of the pockets.

5. The vegetable processing apparatus of claim 4 wherein, two additional water jets are positioned to direct water above the pockets for ejecting non-aligned vegetables, one additional jet being positioned to direct water in a direction substantially aligned with the pockets and the other additional jet being positioned to direct water in a direction at an angle to the pockets.

6. The vegetable processing apparatus of claim 1 wherein, a set of alignment water jets are provided upstream of the water jet for laterally re-positioning the vegetables, the alignment set of water jets being positioned to direct jets of water above the pockets in a manner that causes vegetables resting on top of the pockets to rotate and fall into the pockets.

7. The vegetable processing apparatus of claim 1 wherein, the water jet comprises a first water jet for laterally positioning the vegetable so that one of their ends abut the lateral abutment, in position to have either their tops or tails trimmed by the cutting means, and further comprising a second water jet, a second lateral abutment, and a second cutting means, the second lateral abutment being positioned at the side of the conveyor opposite the first lateral abutment, and the second water jet being positioned to direct a jet of water for laterally re-positioning the vegetables against the second lateral abutment.

8. The vegetable processing apparatus of claim 1 wherein, the pockets of the conveyor are formed by upright, laterally extending dividers that have sufficient height to capture the vegetables.

9. The vegetable processing apparatus of claim 8 wherein, the cutting means includes a blade positioned above the conveyor and wherein the dividers each include a slot extending down to the surface of the conveyor for receiving the blade as the dividers move past the cutting means.

10. The vegetable processing apparatus of claim 9 wherein, the dividers each include multiple slots and wherein a gang cutter is provided for cutting the vegetables into multiple pieces.

11. The vegetable processing apparatus of claim 10 wherein, the gang cutter forms part of the cutting means, the gang cutter adapted to cut the vegetable into multiple segments.

12. The vegetable processing apparatus of claim 1 and further comprising, hold down means for keeping the vegetables within their respective pockets while being repositioned by the water jet.

* * * * *